United States Patent [19]
Stiegler

[11] 3,974,981
[45] Aug. 17, 1976

[54] AUTOMATICALLY OPERATED MAGNETIC TAPE EQUIPMENT

[75] Inventor: Jacques Paul Stiegler, Villepreux, France

[73] Assignee: Compagnie Internationale pour l'Informatique, Louveciennes, France

[22] Filed: Sept. 30, 1974

[21] Appl. No.: 510,166

[30] Foreign Application Priority Data
Oct. 1, 1973 France .............................. 73.34986

[52] U.S. Cl. ............................. 242/182; 242/189
[51] Int. Cl.² .................. G11B 15/58; G11B 23/12
[58] Field of Search ........................ 242/182–191; 360/69, 71, 74

[56] References Cited
UNITED STATES PATENTS

| | | |
|---|---|---|
| 2,669,398 | 2/1954 | Olson ................................ 242/180 |
| 2,990,127 | 6/1961 | Cannings ........................... 242/185 |
| 3,078,056 | 2/1963 | Alterman ........................... 242/183 |
| 3,655,142 | 4/1972 | Mase et al. ........................ 242/182 |

Primary Examiner—Leonard D. Christian
Attorney, Agent, or Firm—Kemon, Palmer & Estabrook

[57] ABSTRACT

In an automatically operated magnetic tape equipment, sudden and important variations of mechanical tension are applied to the tape. In order to prevent any risks of rupture of the tape, an automatic damping of such variations is ensured by establishing that portion of the wall of the duct inputting the chamber of the receiver spool in the form of a resilient arrangement retracting from the duct when the tape which is guided therein is the subject of such a sudden increase of its mechanical tension. A mechanically actuated electrical contact, a part of a tape presence detector, is combined with this resilient arrangement.

6 Claims, 5 Drawing Figures

AUTOMATICALLY OPERATED MAGNETIC TAPE EQUIPMENT

BRIEF SUMMARY OF THE INVENTION

The present invention concerns improvements in or relating to magnetic tape equipments wherein such operations as the unwinding of the tape supply spool up to an automatic fixation to the receiver spool are automatically controlled as presently well known in the art. Normally, a magnetic tape equipment comprises a first chamber for the tape supply spool, a second chamber for the tape receiver spool and a duct connecting said chambers and guiding the tape from the one to the other of said spools during unwinding and rewinding operations. Loading the receiver spool is ensured by unwinding the supply spool so that the free end of the tape enters within the chamber of the receiver spool and is sucked by the vacuum hub of said spool. During this operation, the two spools are driven into rotations the tangential speeds are different in order to avoid any slack in the tape. Usually, the speed of the receiver spool is made equal to or slightly higher than the speed of the supply spool. Consequently, when the free end of the tape reaches the sucking hub of the receiver spool, it is suddenly stretched and, in former equipments, this sudden variation of mechanical tension was absorbed by the intrinsic elasticity of the tape. But now, in magnetic tape equipments, the natures and qualities of the tapes are quite varied so that serious risks of tape rupture occur at such a step of automatic operation of the equipment. Such risks vary from tape to tape and also from length to length of the tapes on the supply spools. A plain palliative for avoiding such risks of rupture of the tapes would be to reduce the ratio of the tangential speeds of the supply and receiver spools but this would reduce the speed of the operation of the equipment, which is now utterly undesirable. When, further, a blocking of one spool occurs which is accidentally possible in any of such equipments, the tape also may break from the sudden mechanical variation of tension it thus receives. At the end of a rewinding operation, too, when the loops of the tape within the conventional vacuum wells evacuate the wells, the tape may also receive a sudden and important stretch. For all these reasons, it is important to provide actual means avoiding the risk of rupture of the tape when submitted to sudden increase of mechanical tension.

According to the invention, said means comprises a resilient arrangement for the portion of the wall of the duct, which guides the tape between the spool, the nearest to the entrance of the chamber of the receiver spool, so that, at such a place, any sudden variation of mechanical tension of the tape is damped, from the displacement of said portion of the wall towards the inner space of the said chamber, up to the equalization of the speeds of rotation of the spools.

According to the invention, further, tape presence detector means are associated to and, preferably, controlled from the actuation of the said resilient arrangement, in that the displacement of said wall portion also controls or enables the control of a mechanically operated electrical contact of said detector means.

Any modification within the field of the invention can be plainly derived from these examples.

DETAILED DESCRIPTION

Figure 1:
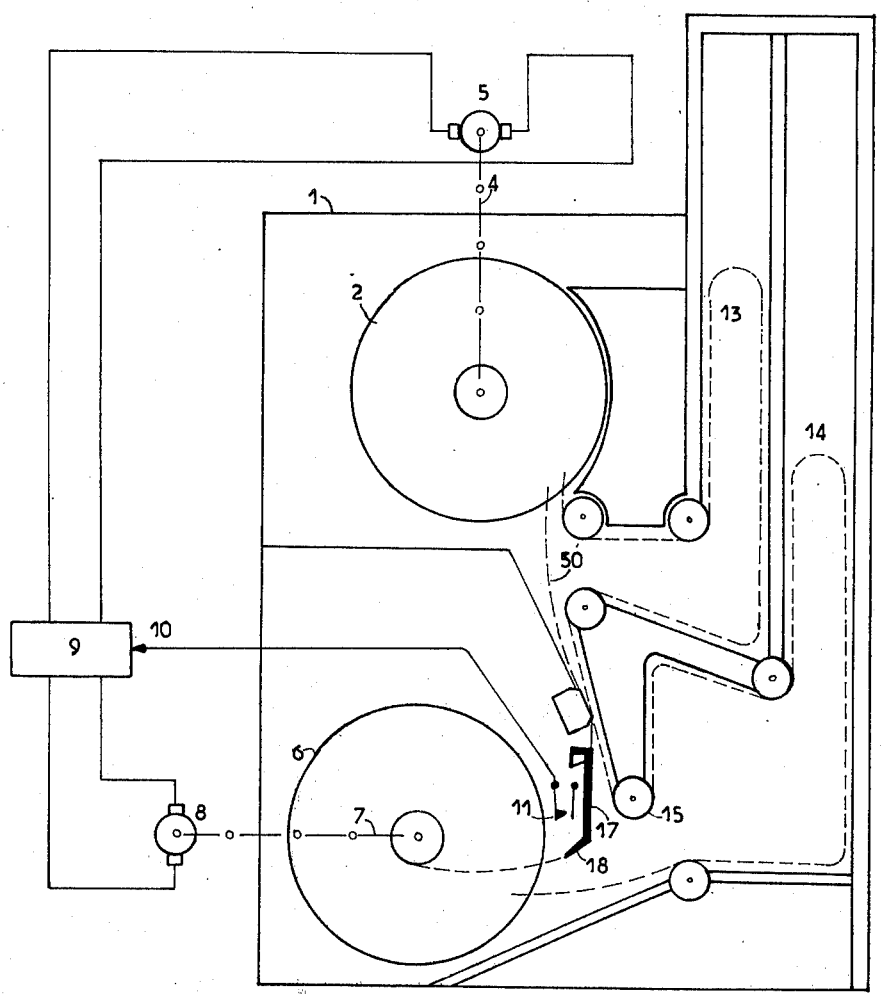
FIG. 1 is a schematic view which shows a magnetic tape equipment of the concerned kind having the present invention embodied therein.

Referring to FIG. 1, the magnetic tape equipment comprises a supply tape spool 2 and a receiver tape spool 6, respectively mounted within chambers of its casing 1, with a duct connecting said chambers for guiding the tape. The supply spool 2, when placed, clamps on a driving shaft 4 the rotation of which is controlled from a two-way motor 5. The receiver spool 6 is permanently secured to a driving shaft 7 the rotation of which is controlled from a two-way motor 8. It must be understood that the hub of said receiver spool is of the well-known vacuum type and that, consequently, when a free end of the tape appears at near proximity of the hub, suction ensured the fixation of said end to the hub. The drive control circuits are merely shown as a block 9 which is not detailed as being of common knowledge of the art and, further, not a part of the invention proper. A particular control input of the circuits 9 is shown at 10 and is connected to a mechanically actuated contact 11 so as to indicate from the closure of said contact, the presence of the tape in the lower part of the duct immediately neighboring the entrance of the chamber of the receiver spool. Such a control is also conventional though the control of the electrical contact 11 is not and depends on the embodiment of the invention in the equipment.

The equipment is shown with the two conventional vacuum columns 13 and 14 wherein, as known, loops of the tape will be formed for stabilizing the position of the tape during normal unwinding and rewinding periods of operation, during the first of which the information on the tape is read-out by a magnetic head block bearing on the tape, which is driven by a capstan 15. However, in the loading of the receiver spool and at the end of the unwinding of said spool, the loops of the tape do not exist within the vacuum columns so that the tape bears against the lower part of the wall of duct near the entrance, or input, of the chamber of the receiver spool. This condition will also occurs when, during operation, one of the spool will accidentally blocks and the loops within the columns disappear.

According to the invention, the lower part of the wall of the duct on which the tape applies when no loop exists within the vacuum column 14 is made as a resilient arrangement responsive to the application of pressure by the tape when the latter is the subject of a sudden stretch for displacement towards the inside of the chamber of the receiver spool, thereby damping the variation of the mechanical tension of the tape.

As shown, this resilient arrangement may consist of a spring blade 17 which constituted the lower portion of said wall up to the edge 18 of the input of the chamber of the receiver spool. At its upper end, said blade can be fixed into the wall, as more clearly shown in FIGS. 2a and 2b. As a modification, the blade 17 could be merely pivotably secured at 16 to the wall at such an upper end and pressed by a spring 17 towards the inside of the duct. In both embodiments, the arrangement will respond to a variation of pressure applied to it by the tape higher than a threshold defined by the elasticity proper of the blade and/or the spring. In the illustrated embodiments of FIG. 2, a block 19 ensures the clamping of the upper part of the blade to the wall of the duct.

Figure 2A:
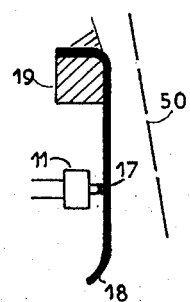
FIGS. 2a and 2b are fragmentary views which show a first illustrative embodiment of the resilient arrangement according to the invention, in respective unactuated and actuated conditions, and, FIG. 2c is a view of another embodiment of the resilient arrangement of the invention.
Figure 2B:
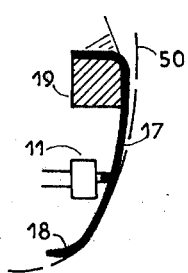

The operation of the device may be plainly explained with consideration of FIGS. 2a and 2b. As long as the magnetic tape 50 does not bear against the blade 17 or bears over said blade with a lower pressure than the threshold of reliliency thereof, the blade 17, FIG. 2a, remains in its "rest" position. As soon as the tape is applied over the blade with a pressure exceeding its resiliency threshold, the blade is actuated and takes the position shown in FIG. 2b. So doing, it absorbs part of the mechanical tension variation which may have been applied to the tape.

Figures 2C, 2D:
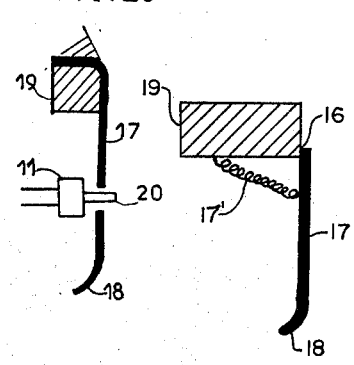
FIG. 2d is a view of an embodiment showing the spring biased blade arrangement.

As above mentioned, in any magnetic tape equipment, the detection of the instant when the tape reaches the receiver spool must be provided for controlling the circuits which, in turn, control the rotations of the motors 5 and 8. With a damping device according to the invention, the electrical contact 11 can be directly actuated by the spring-blade arrangement, as shown in FIGS. 2a and 2b. In an alternative, FIG. 2c, the blade is perforated to provide a passage for a push-member 20 of the electrical contact 11. It must be understood that, in this latter case, the member 20 is level with the face of the blade 17 when this blade is in its rest position. FIG. 2c shows the member 20 in slightly protruding position and consequently the blade 17 will respond to the pressure of the tape slightly after the action of the push-member on the electrical contact, which may be of advantage when taking into account the delay of response of the detector, or sensor means, on the controls of the motors. It must be understood further that, once pushed by the tape, no substantial effort is exerted on the tape by said member 20 — for instance, the push-member 20 may be a part of a micro-switch. When required, on the other hand, both the blade 17 and the member 20, when provided, may act on the electrical contact through a relaying member, a manometric capsula for instance.

Actuation of the electrical contact 11 results in a modification of the programme of automatic operation of the equipment which is not a part of the invention. For the sake of clarity, however, it may be stated that, according to conventional programme of such equipments, it will provoke at least slowing, casually stopping, of the motor 8, and, in certain sequential controls, even a temporary reversal of the direction of rotation of the motor 8. It will further, in normal equipments, start a sequence during which the loops of the tape are formed within the vacuum columns.

What is claimed is:
1. A magnetic tape equipment comprising:
   a. a casing;
   b. a first chamber in said casing;
   c. a tape supply spool in said first chamber;
   d. a second chamber in said casing;
   e. a tape receiver spool in said second chamber;
   f. a duct in said casing connecting said first chamber to said second chamber for the travel of the tape between said spools;
   g. said duct comprising an end wall portion an edge of which also constitutes an edge of said second chamber and against which the tape is applied when stretched between said supply and receiver spools,
   wherein said end wall portion comprises a plate inwardly tiltable to said second chamber when pressed by the stretched tape.

2. A magnetic tape equipment according to claim 1 wherein said plate comprises a spring blade.

3. A magnetic tape equipment according to claim 1 wherein said plate comprises a rigid blade pivotally connected at its far edge from the second chamber edge and a spring pressing said plate outwardly from said second chamber.

4. A magnetic tape equipment according to claim 1 wherein an electrical contact mechanical actuator is located behind said tiltable plate in close proximity thereto.

5. A magnetic tape equipment according to claim 1 wherein an electrical contact is positioned adjacent to the rear face of said tiltable plate.

6. A magnetic tape equipment according to claim 1 wherein said tiltable plate presents a hole and wherein a push member of a mechanically operated electrical contact projects through said hole.

* * * * *